US011115311B1

(12) United States Patent
Schweitzer, III et al.

(10) Patent No.: US 11,115,311 B1
(45) Date of Patent: Sep. 7, 2021

(54) DATA TUNNELING FOR TESTING EQUIPMENT IN ELECTRIC POWER SYSTEM

(71) Applicant: Schweitzer Engineering Laboratories, Inc., Pullman, WA (US)

(72) Inventors: Edmund O. Schweitzer, III, Pullman, WA (US); David E. Whitehead, Pullman, WA (US); Tony J. Lee, Henderson, NV (US); Lisa Gayle Nelms, Colfax, WA (US); Austin Edward Wade, Moscow, ID (US); Krishnanjan Gubba Ravikumar, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 16/876,259

(22) Filed: May 18, 2020

(51) Int. Cl.
*H04L 12/26* (2006.01)
(52) U.S. Cl.
CPC .............. *H04L 43/50* (2013.01); *H04L 43/02* (2013.01); *H04L 43/0811* (2013.01)
(58) Field of Classification Search
CPC ... G06F 3/00; G06F 3/01; G06F 3/016; H04L 29/00; H04L 29/02; H04L 29/06; H04L 29/08; H04L 29/08081; H04L 29/08558; H04L 29/08567; H04L 41/00; H04L 41/08; H04L 41/0803; H04L 41/0893; H04L 41/16; H04L 41/24; H04L 43/00; H04L 43/04; H04L 43/50; H04L 67/00; H04L 67/04; H04L 67/12; H04L 67/125; H04L 67/303; H04L 67/32; H04M 1/00; H04M 1/72415; H04M 1/725

See application file for complete search history.

(56) References Cited

U.S. PATENT DOCUMENTS

| 6,396,279 | B1 | 5/2002 | Gruenert |
| 6,608,493 | B2 | 8/2003 | Hensler |
| 6,795,789 | B2 | 9/2004 | Vandiver |

(Continued)

OTHER PUBLICATIONS

Dolozilek, "IEC 61850", SEL Journal of Reliable Power, vol. 1, No. 2, (Year: 2010).*

(Continued)

*Primary Examiner* — Boris D Grijalva Lobos
(74) *Attorney, Agent, or Firm* — Jared L. Cherry; Richard M. Edge

(57) ABSTRACT

The present disclosure relates to systems and methods for creating a data tunnel to communicate test data in a test configuration in an electric power system. In one embodiment, a remote unit may include a monitored equipment interface to receive information representative of a condition in the electric power system from a test set and a first test data port to communicate test data through the data tunnel in the test configuration. The remote unit may use a first communication subsystem to generate and transmit a stream of data packets comprising information from the monitored equipment interface and information from the first test data port to be routed through the data tunnel. A protection system may receive the stream of data packets from the first communication subsystem and separate information from the monitored equipment interface and information from the test data routed through the data tunnel.

20 Claims, 5 Drawing Sheets

(56) References Cited

U.S. PATENT DOCUMENTS

| | | |
|---|---|---|
| 6,847,297 B2 | 1/2005 | Lavoie |
| 6,892,115 B2 | 5/2005 | Berkcan |
| 6,892,145 B2 | 5/2005 | Topka |
| 6,909,942 B2 | 6/2005 | Andarawis |
| 6,985,784 B2 | 1/2006 | Vandevanter |
| 6,999,291 B2 | 2/2006 | Andarawis |
| 7,012,421 B2 | 3/2006 | Lavoie |
| 7,043,340 B2 | 5/2006 | Papallo |
| 7,058,481 B2 | 6/2006 | Jiang |
| 7,058,482 B2 | 6/2006 | Fletcher |
| 7,068,483 B2 | 6/2006 | Papallo |
| 7,068,612 B2 | 6/2006 | Berkcan |
| 7,111,195 B2 | 9/2006 | Berkcan |
| 7,117,105 B2 | 10/2006 | Premerlani |
| 7,151,329 B2 | 12/2006 | Andarawis |
| 7,254,001 B2 | 8/2007 | Papallo |
| 7,259,565 B2 | 8/2007 | Diercks |
| 7,262,943 B2 | 8/2007 | Stellato |
| 7,301,738 B2 | 11/2007 | Pearlman |
| 7,460,590 B2 | 12/2008 | Lee |
| 7,532,955 B2 | 5/2009 | Dougherty |
| 7,636,616 B2 | 12/2009 | Fletcher |
| 7,693,607 B2 | 4/2010 | Kasztenny |
| 7,747,354 B2 | 6/2010 | Papallo |
| 7,747,356 B2* | 6/2010 | Andarawis ............ H02H 7/263 700/292 |
| 7,986,503 B2 | 7/2011 | Papallo |
| 8,024,494 B2 | 10/2011 | Soed |
| 8,213,144 B2 | 7/2012 | Papallo |
| 8,560,255 B2 | 10/2013 | Elwarry |
| 8,891,963 B2 | 11/2014 | Patel |
| 9,366,711 B2* | 6/2016 | Klapper ............... G01R 31/327 |
| 9,632,147 B2 | 4/2017 | Hensler |
| 9,819,611 B2 | 11/2017 | Snowdon |
| 10,178,047 B2 | 1/2019 | Chapman |
| 10,379,991 B2 | 8/2019 | Yang |
| 2003/0048508 A1 | 3/2003 | Yu |
| 2008/0137543 A1* | 6/2008 | Mitra .................. H04L 43/50 370/242 |
| 2009/0012728 A1 | 1/2009 | Spanier |
| 2009/0296583 A1 | 12/2009 | Dolezilek |
| 2010/0040068 A1 | 2/2010 | Wimmer |
| 2010/0183298 A1 | 7/2010 | Biegert |
| 2016/0013632 A1 | 1/2016 | Lloyd |
| 2017/0026291 A1 | 1/2017 | Smith |
| 2017/0288950 A1 | 10/2017 | Manson |
| 2018/0034689 A1 | 2/2018 | Kanabar |
| 2018/0089057 A1 | 3/2018 | Yang |
| 2018/0238966 A1* | 8/2018 | Louco ................. H02H 7/26 |
| 2018/0348267 A1 | 12/2018 | Yang |

OTHER PUBLICATIONS

David Costello: Understanding and Analyzing Event Report Information, Oct. 2000.

Joe Perez: A Guide to Digital Fault Recording Event Analysis, 2010.

Considerations for Use of Disturbance Recorders; a Report to the System Protection Subcommittee of the Power System Relaying Committee of the IEEE Power Engineering Society, Dec. 27, 2006.

David Costello: Event Analysis Tutorial, Part 1: Problem Statements 2011.

Jane Starck, Antti Hakala-Ranta, Martin Stefanka, Switchgear Optimization Using IEC 61850-9-2 and Non-Conventional Measurements May 23, 2012.

Will Allen, Tony Lee: Flexible High-Speed Load Shedding Using a Crosspoint Switch Oct. 2005.

Qiaoyin Yang, Rhett Smith: Improve Protection Communications Network Reliability Throught Software-Defined Process Bus, Jan. 2018.

Caitlin Martin, Steven Chase, Thanh-Xuan Nguyen, Dereje Jada Hawaz, Jeff Pope, Casper Labuschagne: Bus Protection Considerations for Various Bus Types; Oct. 2013.

* cited by examiner

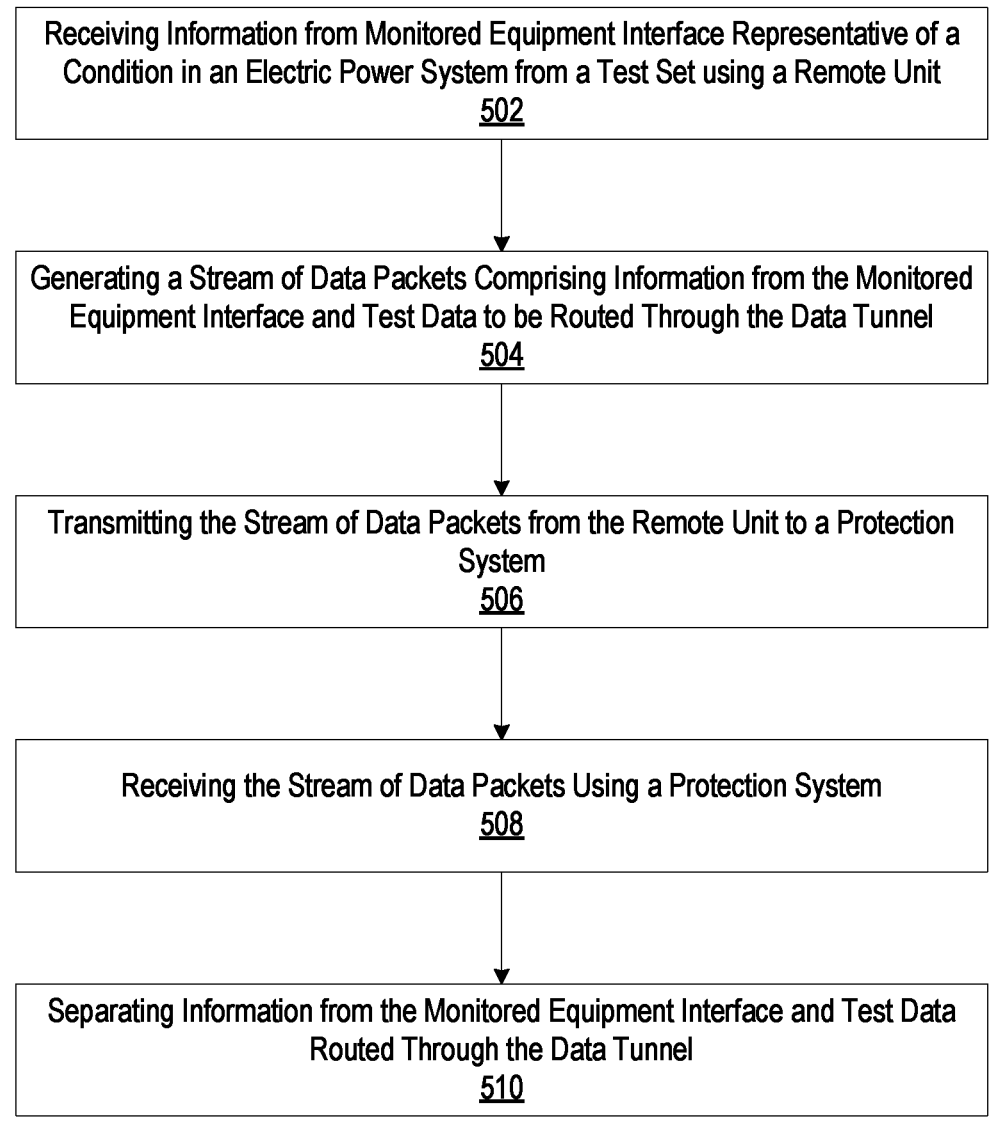

DATA TUNNELING FOR TESTING EQUIPMENT IN ELECTRIC POWER SYSTEM

TECHNICAL FIELD

This disclosure relates to creating a communication link between devices for testing equipment in electric power systems.

BRIEF DESCRIPTION OF THE DRAWINGS

Non-limiting and non-exhaustive embodiments of the disclosure are described, including various embodiments of the disclosure with reference to the figures, in which:

FIG. 5 illustrates a method of creating a data tunnel to communicate test data in an electric power system consistent with embodiments of the present disclosure.

DETAILED DESCRIPTION

Figure 1:
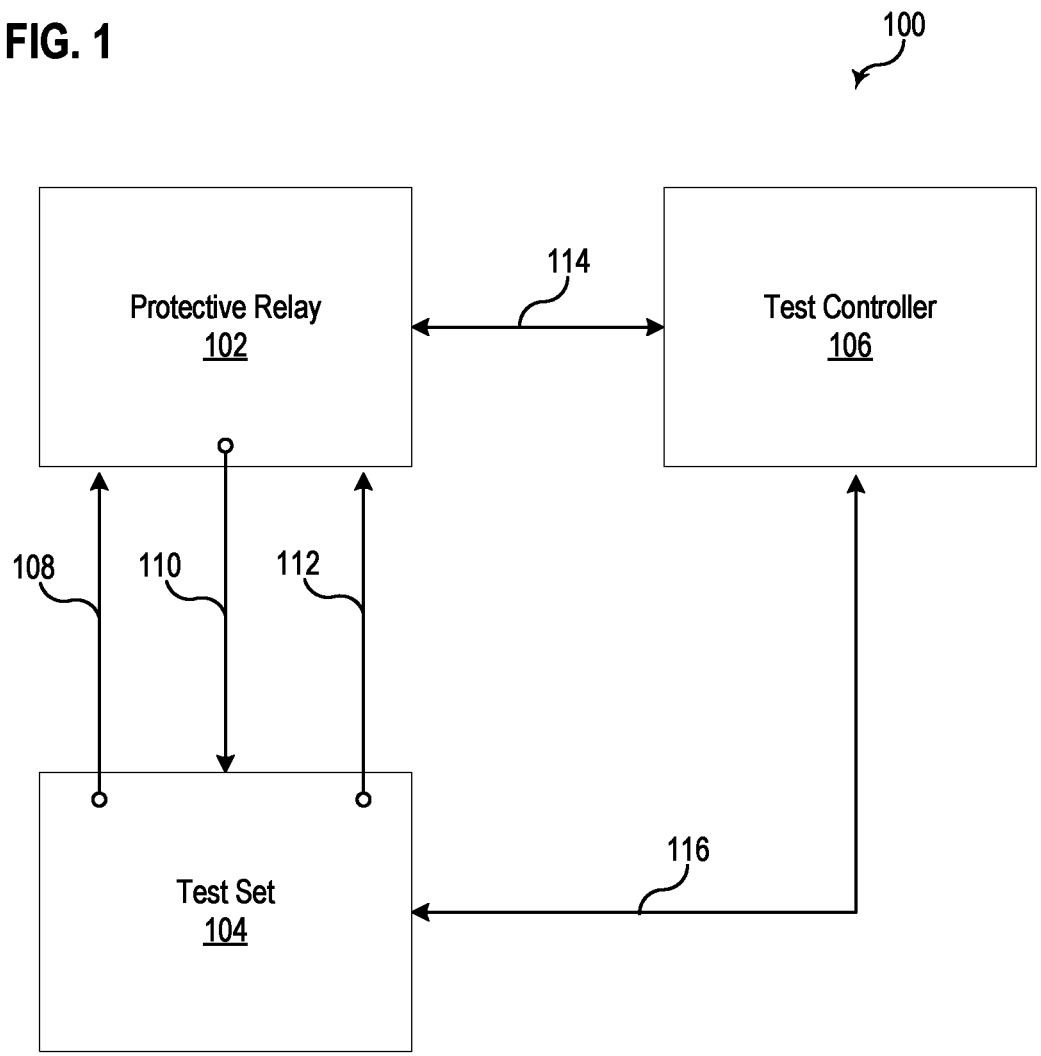
FIG. 1 illustrates a simplified block diagram of a system in a test configuration consistent with embodiments of the present disclosure.

Electric power systems are used to generate, transmit, and distribute electric power to loads, and serve as an important part of critical infrastructure. Electric power systems and equipment may be monitored and protected by a variety of types of equipment. Such equipment may include sensors to monitor currents, voltages, phases, and other parameters of the electric power system. Protection relays may analyze the parameters of the electric power system to implement protective functions. The primary protective relays may communicate with various other supervisory devices such as automation systems, monitoring systems, supervisory (SCADA) systems and other intelligent electronic devices (IEDs).

IEDs may be tested to confirm that such IEDs operate as expected under various conditions. Such tests may be performed when equipment is installed, after changes or updates, and/or periodically. In a test configuration, a test set may create and inject signals that are representative of conditions that may occur in an electric power delivery system. In response to such signals, the protective relay under test may implement various actions (e.g., opening a breaker, stepping up a voltage, connecting a capacitor bank, etc). Proper function on the protective relay in response to tests may confirm that the relay will operate as expected when such conditions occur in the electric power system and ensure that the configuration of the relay is correct. Further, such testing may verify the wiring and operation of various elements (e.g., relay analog-to-digital (A/D) converters, etc.).

The inventors of the present disclosure have recognized that the systems and methods disclosed herein may allow for improvements in testing IEDs by allowing certain types of information to be securely tunneled through point-to-point communication links. Further, the systems and methods disclosed herein may enable the tunneling to be done securely to avoid potential vulnerabilities or exploits that may pose a threat to critical infrastructure, such as electric power systems.

As used herein, an IED may refer to any microprocessor-based device that monitors, controls, automates, and/or protects monitored equipment within a system. Such devices may include, for example, differential relays, distance relays, directional relays, feeder relays, overcurrent relays, voltage regulator controls, voltage relays, breaker failure relays, generator relays, motor relays, remote terminal units, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs. Further, IEDs may include sensors (e.g., voltage transformers, current transformers, contact sensors, status sensors, light sensors, tension sensors, etc.) that provide information about the electric power system.

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor do the steps need to be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations. For example, throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Several aspects of the embodiments disclosed herein may be implemented as software modules or components. As used herein, a software module or component may include any type of computer instruction or computer-executable code located within a memory device that is operable in conjunction with appropriate hardware to implement the programmed instructions. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory machine-readable medium having stored thereon instructions that may be used to program a computer or other electronic device to perform processes described herein. The non-transitory machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable media suitable for storing electronic instructions. In some embodiments, the computer or another electronic device may include a processing device such as a microprocessor, microcontroller, logic circuitry, or the like. The processing device may further include one or more special-purpose processing devices such as an application-specific interface circuit (ASIC), PAL, PLA, PLD, field-programmable gate array (FPGA), or any other customizable or programmable device.

FIG. 1 illustrates a simplified block diagram of a system 100 in a test configuration consistent with embodiments of the present disclosure. A protective relay 102 under test may be connected to a test set 104. Protective relay 102 may comprise an analog input 108, a digital output 110, and a digital input 112. Analog input 108 may receive a voltage or current signal generated by test set 104, and digital input 112 may receive a digital input signal generated by test set 104. In operation, the analog input 108 may receive a signal from a variety of types of analog sensors (e.g., voltage transformers, current transformers, etc.) that measure values in an electric power system. Similarly, digital input 112 may receive digital information of various types, including digitized measurement values (e.g., digital voltage measurements, secondary quantities, equipment status, etc.) or other types of information (e.g., settings, view metering values, and monitor relay status, etc.). Digital output 110 may comprise various signals generated in response to signals received via analog input 108 and digital input 112. For example, digital output 110 may include protective actions (e.g., a command to open a breaker) or other control actions (e.g., a command to step up a voltage transformer).

Test set 104 may comprise one or more analog and digital signal generators that may be used to emulate various conditions in an electric power system. For example, the signals may emulate a fault condition, and the protective relay 102, if configured correctly, should implement actions to clear the emulated fault. If the protective relay 102 fails to operate as expected in response to such conditions, appropriate action may be taken to identify and correct the issues that resulted in protective relay 102 operating in an unexpected way.

Test controller 106 may control the test set 104 using communication link 114. Communication links 114 and 116 typically are embodied as serial or Ethernet cables temporarily connected to protective relay 102 and test set 104. Test controller 106 may allow an operator to control test set 104 and inject secondary quantities to verify protection elements and logic of protective relay 102. Test controller 106 may be embodied by a variety of types of devices, such as a laptop computer, tablet computer, smartphone, or other devices capable of transmitting test instructions to protective relay 102. The length of communication links 114 and 116 may be limited by various issues, including technical, practical, and safety considerations. For example, it may be impractical for operators to utilize long cables to connect physically distant equipment, and it may pose a safety risk to have long cables running through electrical facilities. For these and other reasons, the communication links 114 and 116 are typically limited to approximately 15 feet.

Figure 2:
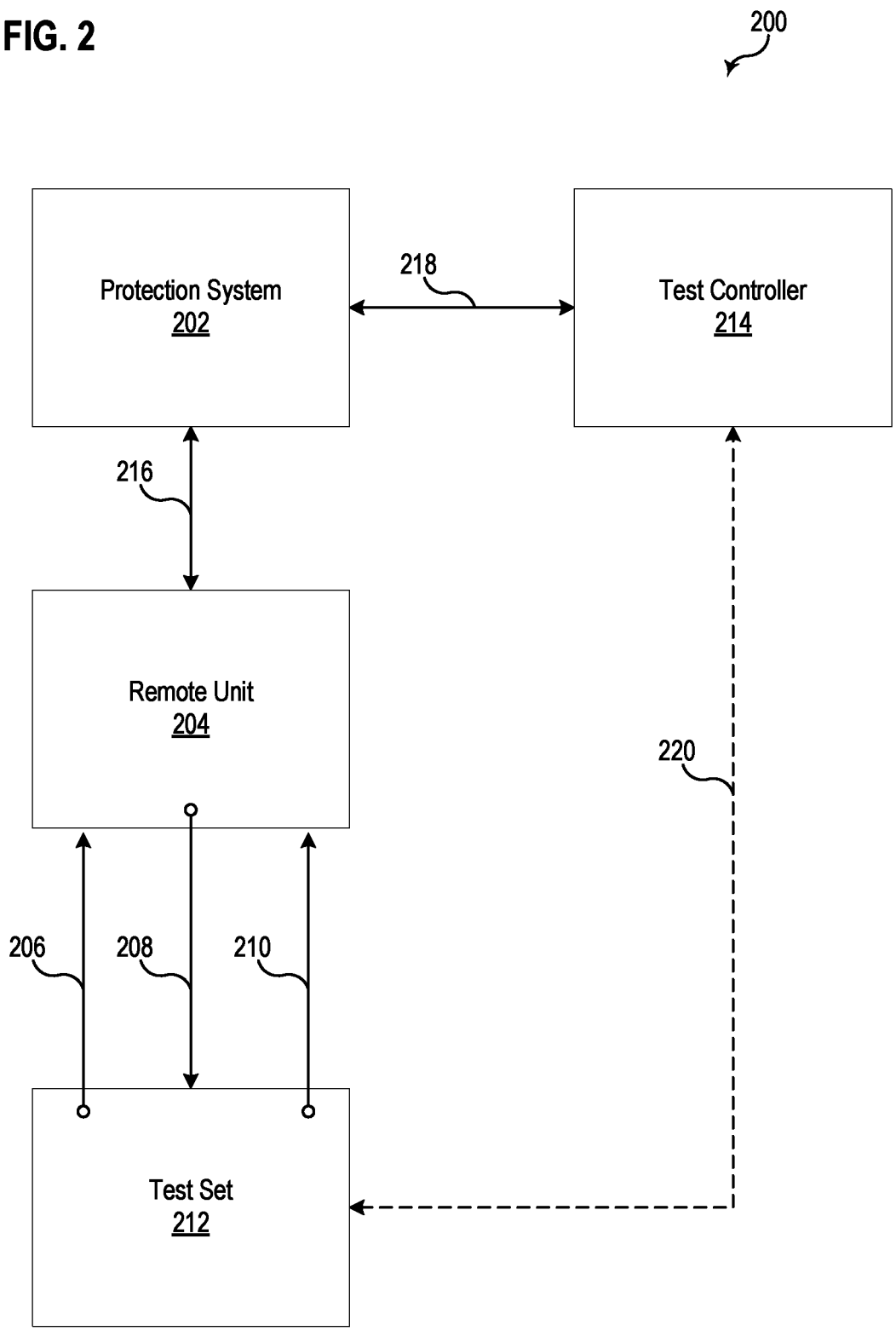
FIG. 2 illustrates a simplified block diagram of a system in a test configuration and including a tunneling point-to-point link between a test controller and a test set consistent with embodiments of the present disclosure.

FIG. 2 illustrates a simplified block diagram of a system 200 in a test configuration including a tunneling communication link 220 between a test controller 214 and a test set 212 consistent with embodiments of the present disclosure. System 200 includes a protection system 202 in communication with a remote unit 204. Remote unit 204 may be embodied as a protective relay or as a merging unit. A merging unit, which may also be referred to as a remote data acquisition unit, receives analog signals (e.g., measurements from current transformers and/or voltage transformers) and converts those signals into digitized values suitable for transmission via digital communication networks. Information from the remote unit 204 may be communicated to protection system 202 via a communication link 216.

Protection system 202 may be embodied as a protective relay or a plurality of devices that collectively operate to protect or automate an electric power system. In various embodiments, protection system 202 may be embodied as a supervisory system. In one specific embodiment, such a supervisory system may comprise an integrator as described in U.S. patent application Ser. No. 16/831,128, filed on Mar. 26, 2020, and titled Integration of Primary Protection Relays for Electric Power Delivery Systems, which is incorporated herein by reference. In other embodiments, a supervisory system may comprise a SCADA system or a wide-area situational awareness (WASA) system.

In a test configuration, remote unit 204 may be connected to test set 212. In various embodiments, remote unit 204 may comprise an analog input 206, a digital output 208, and a digital input 210. Analog input 206 may receive a voltage or current signal generated by test set 212, and digital input 210 may receive a digital input signal generated by test set 212. Digital output 208 may comprise digitized measurement values or other signals generated in response to signals received via analog input 108 and digital input 210.

The communication link 216 between protection system 202 and remote unit 204 may comprise a high-speed point-to-point communication link. The point-to-point communication link may facilitate high-speed, bi-directional communication. The point-to-point link may comprise a non-Internet Protocol (IP) network. In various applications, communication link 216 between protection system 202 and remote unit 204 may cover a considerable distance. In some applications, the physical separation between protection system 202 and remote unit 204 may be up to 500 feet.

Where the protection system 202 is physically separated from the remote unit 204 by a significant distance, it may be difficult or impractical to connect test controller 214 to protection system 202 and test set 212. Further, traffic between test controller 214 and test set 212 may comprise IP data packets.

In the illustrated embodiment, communication link 218 between protection system 202 and test controller 214 may be utilized to establish a tunneling communication link 220, which is shown as a dashed line, between test controller 214 and test set 212. The tunneling communication link 220 may be transmitted via communication link 216, which may be embodied as a point-to-point communication link in various embodiments. The IP data packets transmitted between test set 212 and test controller 214 may be inserted into data packets transmitted between remote unit 204 and test controller 214 to create a tunneling communication link 220 between test controller 214 and test set 212. The tunneling communication link 220 may avoid the need to use a lengthy cable stretching between the physical location of test set 212 and test controller 214.

Figure 3A:
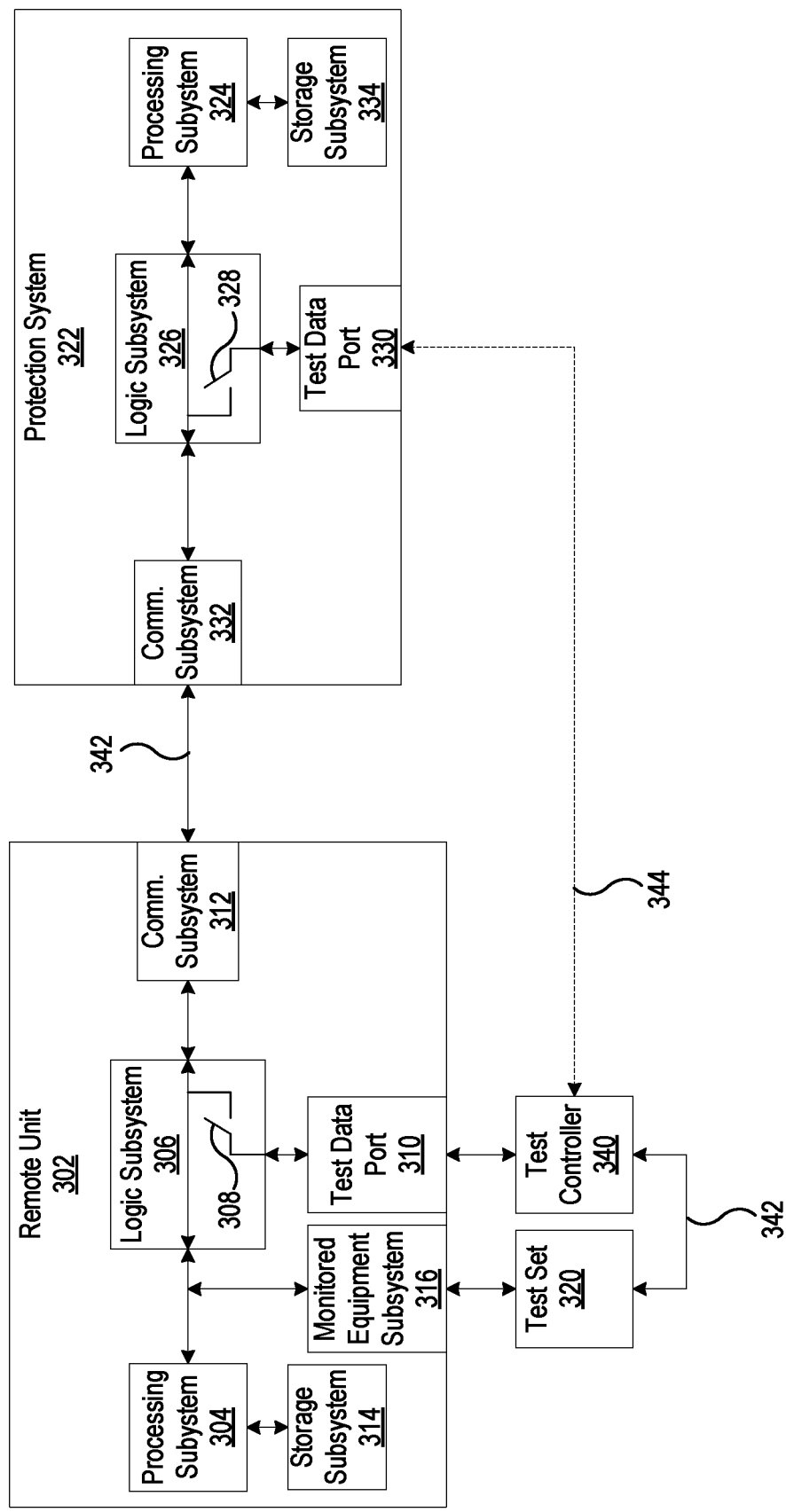
FIG. 3A illustrates a simplified block diagram of a system comprising a protection system and a remote unit, each of which comprises ports that are selectively enabled in a test configuration consistent with embodiments of the present disclosure.

FIG. 3A illustrates a simplified block diagram of a system 300 comprising a remote unit 302 and a protection system 322, which comprise test data ports 310 and 330, respectively. Test data port 310 and test data port 330 are selectively enabled in a test configuration consistent with embodiments of the present disclosure. Test data port 310 and test data port 330 may be selectively enabled in a test configuration and otherwise disabled to reduce the potential for unauthorized access to remote unit 302 and/or protection system 322. Electrical power systems are considered critical infrastructure and interruption of electrical service and/or damage an electric power system can result in far-reaching consequences. Accordingly, stringent security measures may be employed to prevent an unauthorized individual or entity from gaining unauthorized access to or control of remote unit 302 and protection system 322. Test data port 310 and test data port 330 may be disabled in an operating configuration.

Remote unit 302 and protection system 322 each comprise a processing subsystem 304 and 324 to execute instructions stored on storage subsystems 314 and 334, respectively. Processing subsystems 304 and 324 may operate using any number of processing rates and processor architectures. Processing subsystems 304 and 324 may perform any of the various algorithms and calculations described herein. Processing subsystems 304 and 324 may be embodied as a general-purpose integrated circuit, an application-specific integrated circuit, a field-programmable gate array, and/or any other suitable programmable logic device. Storage subsystems 314 and 334 may comprise a variety of types of computer-readable storage media (e.g., a hard disk drive, flash memory, etc.), including non-transitory computer-readable media and volatile storage (e.g., random access memory). Instructions associated with the algorithms and calculations described herein may be permanently stored in storage subsystems 314 and 334.

Remote unit 302 and protection system 322 each also comprise a logic subsystem 306 and 326, respectively, that may selectively enable test data ports 310 and 330, respectively. Logic subsystems 306 and 326 may disable test data ports 310 and 330, respectively, in an operating configuration and may enable the ports in a test configuration. Maintaining test data ports 310 and 330 in a disabled configuration may reduce the potential for unauthorized access to remote unit 302 and protection system 322. When test data port 310 and test data port 330 are enabled, they may be connected by switches 308 and 328, respectively, to communication subsystems 312 and 332. When test data port 310 and test data port 330 are disabled, switches 308 and 328 may be open, thus preventing the transmission of data via test data ports 310 and 330 and providing additional security. In various embodiments, logic subsystem 306 and logic subsystem 326 may enable test data port 310 after the operator successfully logs into the protection system 322. If the operator does not successfully log in, test data ports 310 and 330 may remain non-functional. In the illustrated embodiment, test data ports 310 and 330 are not routed through processing subsystem 304 and processing subsystem 324, respectively, to increase security. In alternative embodiments, the ports may be routed through a respective processing subsystem.

While remote unit 302 is under test, a test set 320 may be connected to a monitored equipment subsystem 316. A monitored equipment subsystem 316 may typically be in communication with monitored equipment that is operable to control equipment in an electric power system. Monitored equipment subsystem 316 may issue commands to and/or receive status information from monitored equipment. In certain embodiments, monitored equipment subsystem 316 may be in communication with, for example, a circuit breaker and may issue commands to the circuit breaker to selectively connect or disconnect portions of the electric power system. In a test configuration, monitored equipment subsystem 316 may receive signals from test set 320. Test set 320 may be in communication with a test controller 340 by communication link 342.

Test controller 340 may be in communication with protection system 322 via a tunneling point-to-point link 344, which is shown as a dashed line, between test controller 340 and protection system 322. The tunneling point-to-point link 344 between test controller 340 and protection system 322 may be created utilizing communication link 342 between remote unit 302 and protection system 322. As such, all of the equipment used to complete the test may be located proximate to the remote unit 302. In embodiments in which communication link 342 comprises a non-IP network, communication subsystem 312 and communication subsystem 332 may each comprise a non-IP port.

Figures 3B, 4:
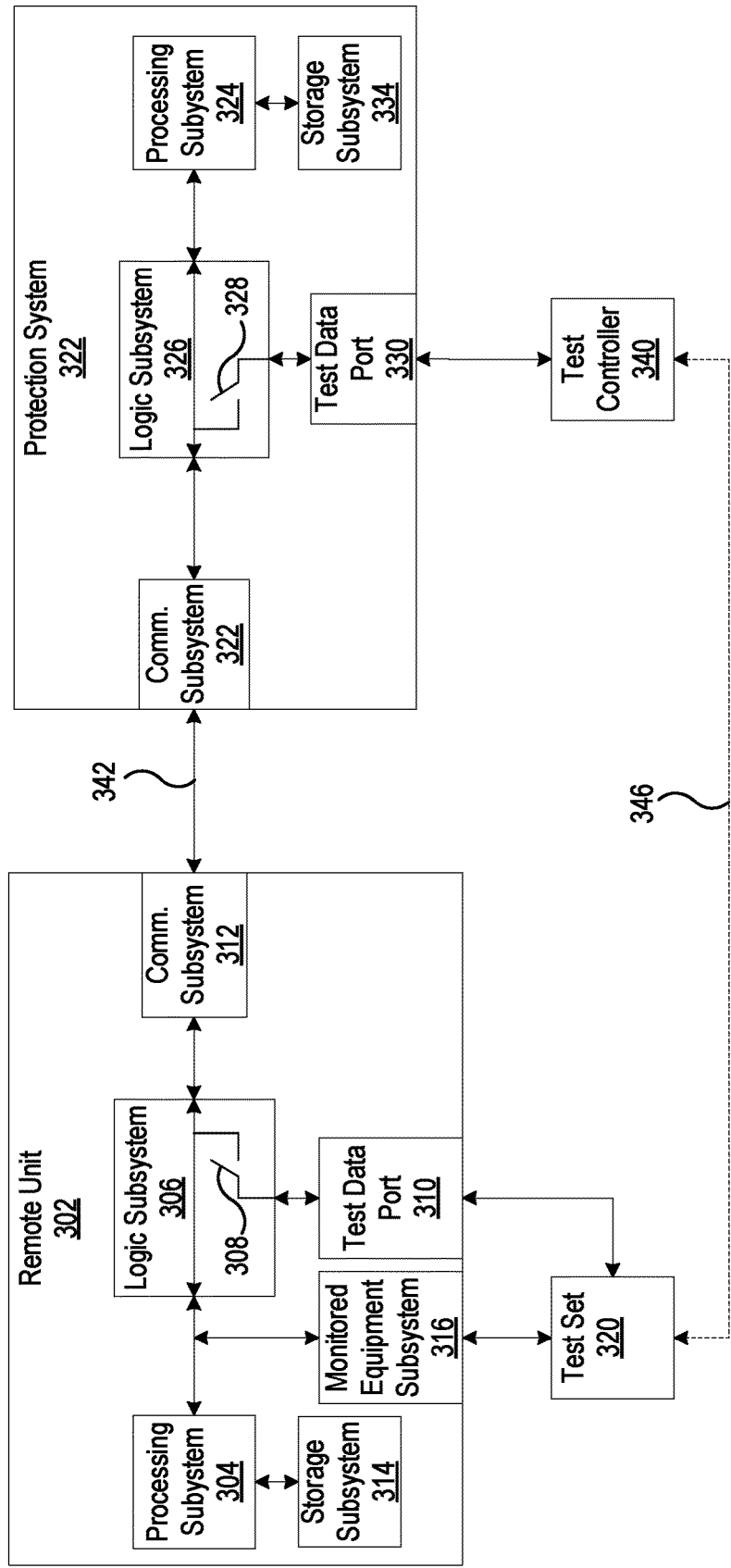
FIG. 3B illustrates the system illustrated in FIG. 3A in an alternative configuration consistent with embodiments of the present disclosure.
FIG. 4 illustrates a conceptual representation of a point-to-point packet including tunneled data consistent with embodiments of the present disclosure.

FIG. 3B illustrates the system 300 illustrated in FIG. 3A in an alternative configuration consistent with embodiments of the present disclosure. In FIG. 3B, the test controller 340 is connected to test data port 330. Test set 320 may be connected to test data port 310, and a tunneling point-to-point link 346 may be created between test set 320 and test controller 340 using communication link 342. Tunneling point-to-point link 346 may be used by test controller 340 to deliver instructions to test set 320 and to receive information from test set 320. In other words, an operator may remotely control the test set 320 while the test controller 340 is connected to protection system 322. The tunneling point-to-point links 344 and 346, respectively, in FIG. 3A and FIG. 3B may be transparent connections between devices.

In various embodiments, the tunneling may be implemented in various ways. For example, an FPGA, microprocessor, system on chip (SOC), or the like may be used to perform the tunneled data insertion and extraction. Various technologies may be used to connect test controller 340 and test set 320 to remote unit 302 and/or protection system 322 in various configurations. For example, Ethernet, universal serial bus (USB), serial or other proprietary communication protocols and various types of media may be used.

FIG. 4 illustrates a conceptual representation of a point-to-point packet 400 including tunneled data consistent with embodiments of the present disclosure. A packet header 402 may identify a sender and recipient of the point-to-point packet 400. A packet payload 404 may contain information transmitted between devices that communicate via the point-to-point communication link. Finally, a tunnel data payload 406 may be included that includes data tunneled through the point-to-point communication link.

The size of the tunnel data payload 406 may be determined based on various factors (e.g., a data transmission rate, a required throughput, etc.). In one specific embodiment, the tunnel data payload 406 is 16 bytes. In other embodiments, the tunnel data payload 406 may be greater than 16 bytes. Further, to accommodate high-bandwidth tunneled data, the data typically transferred in packet payload 404 may be downsampled to allow the tunnel data payload 406 to use half or more of the total link bandwidth. For example, data measurements may be downsampled from 16-bits to 12-bits to reduce the size of the packet payload 404.

Upon receipt of point-to-point packet 400, a receiving device may route the tunnel data payload 406 to an ethernet communication stack. Accordingly, the tunneled data communication link may be transparent to end devices.

FIG. 5 illustrates a method 500 of creating a data tunnel to communicate test data in an electric power system consistent with embodiments of the present disclosure. At 502, information from a monitored equipment interface representative of a condition in an electric power system may be received from a test set using a remote unit. The monitored equipment interface may comprise, among other things, an analog input to receive voltage or current measurements, and/or a digital input to receive digital information related to equipment in the electric power system. The remote unit may comprise a protective relay, a merging unit, or another type of device that monitors electrical equipment. While a system is under test, the monitored equipment interface may be connected to a test set that generates signals representative of various conditions (e.g., over-current conditions, under-frequency conditions, etc.) to determine whether a system initiates protective actions (e.g., interrupting an electrical current, shedding load, etc.) to remedy the particular condition.

At 504, a stream of data packets comprising information from the monitored equipment interface and test data to be routed through a data tunnel may be generated. The stream of data packets may comprise information typically transmitted between a remote unit and a protection system while in an operating configuration. In addition to such information, test data may be included in the stream of data packets and communicated via the data tunnel. The test data may include, among other things, communication between a test controller and a test set. For example, the test data may include a command for the test set to generate a signal representative of a condition in the electric power system (e.g., a fault). Further, the test data may also include information about a protective action taken by a system under test (e.g., issuing a command to trip a breaker to interrupt the flow of current through a fault).

At 506, the stream of data packets may be transmitted from the remote unit to a protection system. In some embodiments, the stream of data packets may be transmitted using a point-to-point communication link that transmits non-IP packets, while the test data may be comprised of IP packets. In such embodiments, the IP packets comprising test data may be encapsulated in a portion of a data packet using the data packet structure illustrated in FIG. 4. The bandwidth allocated may be a fixed value in some embodiments (e.g., 16-bytes per packet) or may be a variable value. In some embodiments, the bandwidth allocated to the data tunnel may be increased by downsampling data transmitted outside of the data tunnel.

At 508, a protection system may receive the stream of data packets, and at 510, the protection system may separate information from the monitored equipment interface and test data routed through the data tunnel from information in the data tunnel. The protection system may parse a data packet, such as the data packet illustrated in FIG. 4, into the packet payload and the tunnel data payload. The tunnel data payload may comprise a data packet including test data, while the packet payload may comprise information typically transmitted between the remote unit and the protection system. The information routed through the data tunnel may be routed according to different criteria (e.g., IP routing information) by passing the packet to an appropriate routing system (e.g., a TCP/IP stack).

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A system to communicate test data in a test configuration in an electric power system, the system comprising:
   a remote unit, comprising:
      a monitored equipment interface to receive information representative of a condition in the electric power system from a test set;
      a first test data port to communicate test data through a data tunnel in the test configuration; and
      a first communication subsystem to:
         generate a stream of data packets comprising information from the monitored equipment interface and information from the first test data port to be routed through the data tunnel; and
         transmit the stream of data packets; and
   a protection system, comprising:
      a second communication subsystem to:
      receive the stream of data packets from the first communication subsystem; and
      separate information from the monitored equipment interface and information from the test data routed through the data tunnel.

2. The system of claim 1 further comprising a test controller configured to issue a command through the data tunnel to the test set to generate the signal.

3. The system of claim 1, wherein the protection system further comprises a second test data port, and test data routed through the data tunnel passes between the first test data port and the second test data port.

4. The system of claim 1, further comprising:
   a logic subsystem in the remote unit to selectively enable the first test data port in the test configuration and selectively disable the first test data port in an operating configuration.

5. The system of claim 4, wherein the logic subsystem separates the first test data port from a processing subsystem of the remote unit.

6. The system of claim 1, wherein the remote unit comprises a merging unit to receive at least one analog signal and to convert the at least one analog signal to a plurality of digitized values transmitted in the stream of data packets.

7. The system of claim 1, wherein the remote unit comprises a protective relay and the protection system comprises a supervisory system.

8. The system of claim 1, wherein the first communication subsystem and the second communication subsystem are configured to communicate through a point-to-point communication link configured to transmit non-internet protocol (non-IP) packets.

9. The system of claim 8, wherein the test data comprises internet protocol (IP) packets and the IP packets are encapsulated in the non-IP packets transmitted via the point-to-point communication link.

10. The system of claim 1, wherein the remote unit is configured to downsample information from the monitored equipment interface to increase bandwidth available to the data tunnel to communicate test data.

11. A method of communicating test data in a test configuration in an electric power system, the method comprising:
receiving, using a monitored equipment interface of a remote unit, a signal representative of a condition in the electric power system from a test set;
generating, using a first communication subsystem of the remote unit, a stream of data packets comprising information from the monitored equipment interface and information from a first test data port to be routed through a data tunnel;
transmitting, using the first communication subsystem of the remote unit, the stream of data packets;
receiving, using a second communication subsystem of a protection system of the remote unit, the stream of data packets from the first communication subsystem; and
separating, using the second communication subsystem of the protection system, information from the monitored equipment interface and the test data routed through the data tunnel.

12. The method of claim 11 further comprising:
issuing a command, using a test controller, to the test set through the data tunnel to generate the signal; and
generating the signal, using the test set.

13. The method of claim 11, wherein the protection system further comprises a second test data port, and wherein test data routed through the data tunnel passes between the first test data port and the second test data port.

14. The method of claim 11, further comprising:
selectively enabling, using a logic subsystem of the remote unit, the first test data port in the test configuration and selectively disabling the first test data port in an operating configuration.

15. The method of claim 14, wherein the logic subsystem separates the first test data port from a processing subsystem of the remote unit.

16. The method of claim 11, wherein the remote unit comprises a merging unit to receive at least one analog signal and to convert the at least one analog signal to a plurality of digitized values transmitted in the stream of data packets.

17. The method of claim 11, wherein the remote unit comprises a protective relay and the protection system comprises a supervisory system.

18. The method of claim 11, wherein the first communication subsystem and the second communication subsystem are configured to communicate through a point-to-point communication link configured to transmit non-internet protocol (non-IP) packets.

19. The method of claim 18, wherein the test data comprises internet protocol (IP) packets and the IP packets are encapsulated in the non-IP packets transmitted via the point-to-point communication link.

20. The method of claim 11, further comprising:
downsampling, using the remote unit, information from the monitored equipment interface to increase bandwidth available to the data tunnel to communicate test data.

* * * * *